United States Patent
Balachandran et al.

(10) Patent No.: US 8,638,661 B2
(45) Date of Patent: Jan. 28, 2014

(54) PARTITIONING RESOURCES WITH SOFT REUSE IN A WIRELESS NETWORK

(75) Inventors: Krishna Balachandran, Morganville, NJ (US); Joseph H. Kang, Belle Mead, NJ (US); Kemal M. Karakayali, Highland Park, NJ (US); Kiran M. Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 269 days.

(21) Appl. No.: 13/027,990

(22) Filed: Feb. 15, 2011

(65) Prior Publication Data

US 2012/0207037 A1 Aug. 16, 2012

(51) Int. Cl.
*H04W 74/00* (2009.01)

(52) U.S. Cl.
USPC .......... 370/229; 370/252; 370/329; 370/344; 455/509; 455/524

(58) Field of Classification Search
None
See application file for complete search history.

(56) References Cited

U.S. PATENT DOCUMENTS

| | | | | |
|---|---|---|---|---|
| 8,331,285 B2 * | 12/2012 | Prakash | ......................... | 370/328 |
| 8,340,070 B2 * | 12/2012 | Bhushan et al. | .............. | 370/344 |
| 2010/0124181 A1 * | 5/2010 | Hosein | ........................... | 370/252 |
| 2011/0003611 A1 * | 1/2011 | Haas et al. | ..................... | 455/512 |

* cited by examiner

*Primary Examiner* — Chi Pham
*Assistant Examiner* — Shick Hom
(74) *Attorney, Agent, or Firm* — Duft, Bornsen & Fettig, LLP

(57) ABSTRACT

Systems and methods are disclosed for reusing resources of a wireless network. Radio communications resources of the wireless network are divided into partitions. A system described herein allows access to resources in the first partition by a first set of users for primary communications on the first partition, and allows access to resources in the first partition by a second set of users for secondary communications on the first partition. The control system also allows access to resources in the second partition by the second set of users for primary communications on the second partition, and allows access to resources in the second partition by the first set of users for secondary communications on the second partition.

20 Claims, 3 Drawing Sheets

PARTITIONING RESOURCES WITH SOFT REUSE IN A WIRELESS NETWORK

FIELD OF THE INVENTION

The invention is related to the field of communications, and more particularly, to allocating resources in a wireless network.

BACKGROUND

A typical wireless network is comprised of multiple base stations. Alternatively referred to as cell sites or cells since their coverage area may resemble a cell, a base station may communicate with one or more mobile devices within their coverage area. Across the wireless network, one or more transmitters may communicate with one or more receivers across a common communications medium. With multiple access technologies, air interface channels are segmented so that they may be shared by multiple users. For example, a channel may be segmented into frequencies for FDMA technology, into codes for CDMA technology, into time slots for TDMA technology, etc. The segments of the air interface channels are referred to herein as resources.

There may be situations where all resources are used by all base stations in the wireless network. When this occurs, there may be significant interference between base stations which leads to unreliable or slower communication links. For instance, in emerging networks such as the heterogeneous networks being considered by 3GPP standards, there may be both macrocells (typical base stations that are intended to provide service over a wide geographic area) and small cells (base stations with smaller form factors and smaller service areas due to significantly reduced transmit powers and antenna gains) in the same vicinity. The principal objective of deploying small cells within the coverage area of macrocells is to provide additional system capacity (by offering additional resources), perhaps to users that are tightly clustered in certain spots and the available resources offered by the macrocell must be shared by many users. However, in heterogeneous networks where macrocells and small cells share the same resources, the significantly higher transmit powers and antenna gains of the macrocells lead to exceedingly small coverage areas for the small cells thus rendering throughput/capacity benefits to only a small number of users. Further, while a small number of users may communicate at higher rates (primarily because they share the available resources with fewer users), they may only demand low rate services (e.g., VoIP) or have large periods of data inactivity where the higher achievable rates cannot be exploited. In such a case, the expected gains would not be achieved.

In order to avoid interference between neighboring base stations, the communication resources available to the wireless network may be divided into disjoint subsets called partitions. It is typical to statically and exclusively allocate a set of resources to a distinct set of users in the network. In one example (e.g., a reuse ⅓ deployment of the $3^{rd}$ Generation Partnership Project (3GPP) Long Term Evolution (LTE)), the frequency band available to the wireless network may be partitioned into three mutually exclusive sets (frequency sets 1, 2, and 3) which together constitute the entire frequency band of the wireless network. These three sets of frequencies may be allocated to three mutually exclusive sets of base stations (sets A, B, and C) which together represent all of the base stations in the wireless network. In this type of resource allocation, frequency set 1 is exclusively and statically assigned to base stations in set A, frequency set 2 is exclusively and statically assigned to base stations in set B, and frequency set 3 is exclusively and statically assigned to base stations in set C. The exclusive assignment precludes a base station in set A from using resources in set 2 or set 3.

Allocating different resources to small cells and macrocells would benefit heterogeneous deployments since small cell users would no longer experience strong interference from macrocells. As a result, the spectral efficiency and coverage area for small cells would improve. However, the exclusive partitioning of resources may lead to a sizeable loss in service rates.

SUMMARY

Embodiments described herein create static or dynamic resource partitions within a wireless network, and allow for reuse of resources under the control of defined transmission rules. Within each partition, users (e.g., base stations, mobiles, services, or technologies) are allowed primary use of the resources allocated to that partition, which is referred to as primary communications. Additionally, other users may be allowed secondary use of the resources allocated to the partition, which is referred to as secondary communications. The secondary communications on a partition will in general follow a different set of transmission rules than primary communications on the partition. The set of transmission rules for secondary communications in a partition will in general help to avoid a situation where the secondary communications cause interference to primary communications for a partition. Because potential interference between secondary communications and primary communications is kept to a minimum by adhering to the transmission rules, resources may be effectively reused to improve the performance of the wireless network (e.g., higher throughputs, increased Quality of Service (QoS)).

One embodiment comprises a control system implemented in a wireless network. Radio communications resources of the wireless network are divided into partitions, and the resources (or subsets thereof) are allocated to each of the partitions. The control system is operable to allow access to resources in the first partition by a first set of users for primary communications on the first partition as controlled by a first set of transmission rules, and to allow access to resources in the first partition by a second set of users for secondary communications on the first partition as controlled by a second set of transmission rules.

The control system is further operable to allow access to resources in the second partition by the second set of users for primary communications on the second partition as controlled by a third set of transmission rules, and to allow access to resources in the second partition by the first set of users for secondary communications on the second partition as controlled by a fourth set of transmission rules.

In this embodiment, the control system allows users of the first partition access to the resources in the first partition for primary communications, and also allows users of the second partition access to the resources in the first partition for secondary communications. Thus, the resources of the first partition are being reused by the users of the second partition for secondary communications. The secondary communications are controlled by a second set of transmission rules that are typically more restrictive than the transmission rules defined for primary communications over the first partition. The more restrictive transmission rules help to ensure that the secondary communications over the first partition do not interfere with the primary communications over the first partition.

Effective reuse of resources as described in this embodiment increases the throughput of the wireless network.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
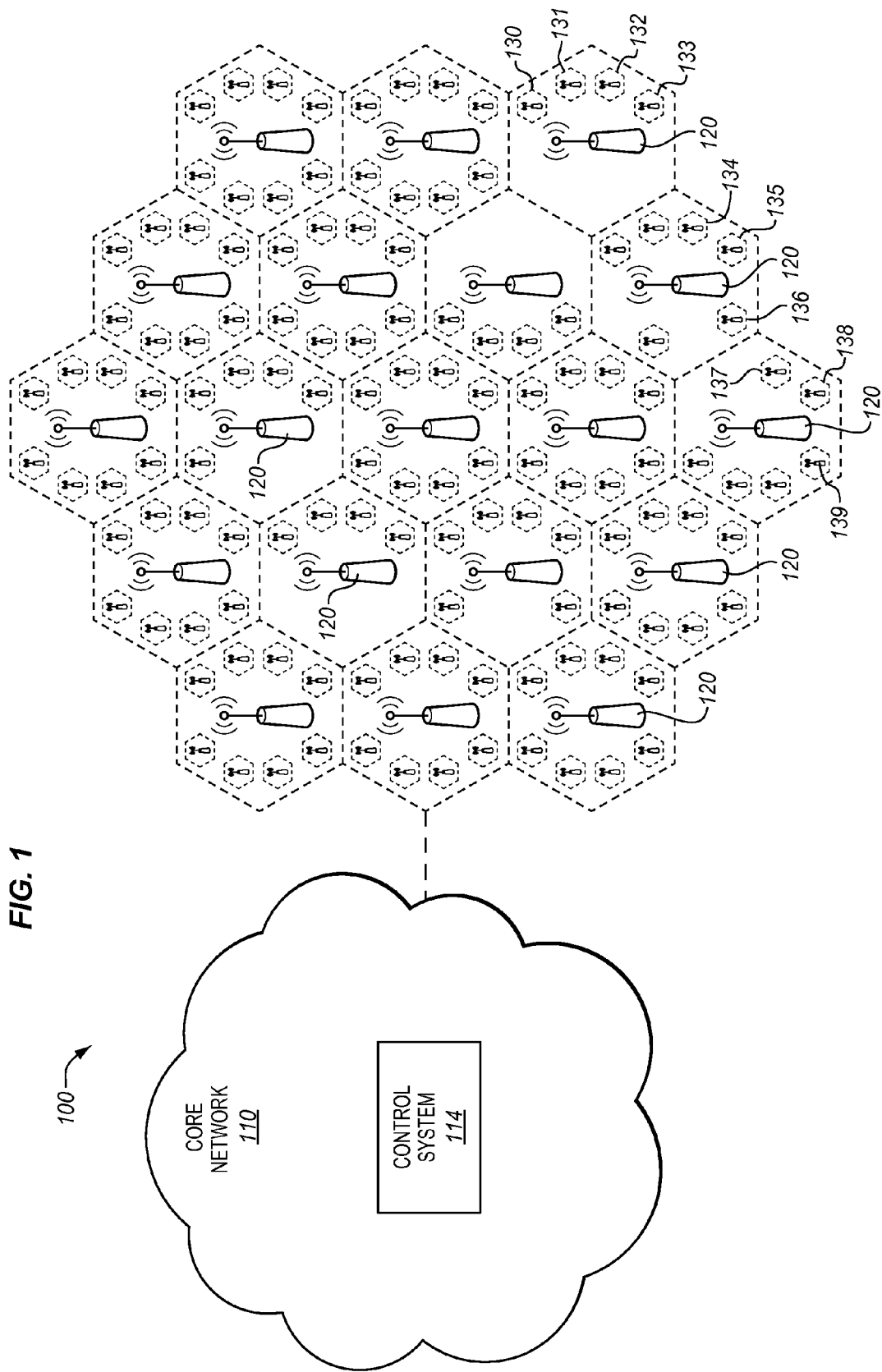
FIG. 1 illustrates a wireless network in an exemplary embodiment.

FIG. 1 illustrates a wireless network 100 in an exemplary embodiment. Wireless network 100 may comprise an LTE network, where base stations 120 comprise eNodeBs, or may comprise any other type of wireless network. Each of base stations 120 has a coverage area where mobile devices (not shown) are able to exchange radio communications (i.e., wireless signals) with a base station. The coverage areas in FIG. 1 are represented by hexagons surrounding each of the base stations 120. Wireless network 100 also includes a control system 114 that regulates the operation of wireless network 100. Although FIG. 1 shows control system 114 as a distinct entity, in practice its elements may reside in various components of wireless network 100, such as base stations 120.

For the sake of example, base stations 120 are referred to as macrocells. Wireless network 100 is also shown as including additional base stations 130-139 that are implemented within or proximate to the coverage areas of the macrocells. Each of base stations 130-139 also forms a cell within wireless network 100. Base stations 130-139 are referred to as "small cells". A small cell comprises any cell that is smaller than a macrocell, such as a microcell, a picocell, a femtocell, etc.

Control system 114 is able to partition resources available to wireless network 100. A resource available to wireless network 100 refers to segments of an air interface channel in a multiple access technology. Examples of resources may be codes (e.g., for CDMA), time segments (e.g., for TDMA), frequencies (e.g., for FDMA), time-frequency blocks (e.g., for OFDM/OFDMA systems), etc. Partitioning of resources thus refers to dividing the available resources of wireless network 100 into disjoint subsets. The partitioned resources may be allocated to different entities to facilitate communications.

The allocation of the partitioned resources of wireless network 100 may be carried out in many desired ways. In one example, the partitioned resources may be allocated to different base stations or cells based on their type. In FIG. 1, one partition may be allocated to macrocells while another partition may be allocated to small cells. In another example, different partitions of the available resources may be allocated based on types of services, such as one partition for VoIP calls and another partition for high-rate data services. In yet another example, the partitioned resources may be allocated based on types of end users or mobile devices, such as one partition for slow moving mobiles and another partition for fast moving mobiles. A fourth method would allocate the partitioned resources based on the type of technology being used by the mobile device. For example, one partition may be allocated to mobile devices that support Multi-Input-Multi-Output (MIMO) communications while the other partition may be allocated to those mobile devices that cannot support MIMO communications. In summary, the resources available to wireless network 100 may be partitioned in any desired way and the partitioned resources may be allocated based on base station type, service type, user type, technology type, etc., or some combination thereof.

Control system 114 may be used to initially and/or continually make determinations of how to partition the resources available to wireless network 100. One step of the determination includes determining an amount of resources to allocate to each partition. In one embodiment, an equal amount of resources may be allocated to each partition. In another embodiment, the amount of resources allocated to each partition may be proportional to the number of users accessing the partition. In yet another embodiment, the amount of resources allocated to each partition is proportional to the amount of traffic estimated for users accessing the partition. The traffic estimate may be based on the types of services being demanded or other historical information. In yet another embodiment, the amount of resources allocated to each partition may be proportional to the sum of resources demanded by users accessing the partition, where each target user rate may be different based on the type of traffic demanded and/or other historical information. For example, consider the case where N resources are to be partitioned, the target rate for user j in partition i is $T_{i,j}$, and the estimated rate achieved per resource element is $R_{i,j}$. In this case, the desired number of resources for partition i may be:

$$D_i = \Sigma_j f(T_{i,j}/R_{i,j}).$$

The number of resources allocated to partition i may be:

$$g(N*D_i/(\Sigma_j D_j)).$$

The functions f(.) and g(.) may be commonly known functions such as the identity function, the round off function, the floor function, or the ceiling function. The amount of resources allocated to each partition may be static or dynamic.

Another step of the determination includes selecting the resources to allocate to each partition. In one embodiment, the resources selected may be contiguous in time and/or frequency. In another embodiment, the resources selected may be regularly distributed across the defined space (e.g., time and/or frequency). In yet another embodiment, the resources selected may be hopped across the defined space. For the latter two cases, the primary benefit is to provide diversity (e.g., in time, frequency, and/or interference), which is known to provide gains at the physical layer of a wireless network.

Assume for this embodiment that at least two partitions (e.g., Partition 1 and Partition 2) are defined within wireless network 100. Further assume that a subset of resources is allocated to each of the partitions, such as resources R1-R10 to Partition 1 and resources R11-R20 to Partition 2. In addition to the resources available to wireless network 100 being partitioned, users in wireless network 100 are assigned to a partition. The term "user" in this embodiment refers to a user of resources allocated to a partition, such as a base station, a service, a technology, etc. A user that is assigned to a partition has primary use of the resources allocated to that partition for communications. When a user that has primary use of the resources in a partition communicates using those resources, we refer to those communications as primary communications over that partition.

The embodiments described herein also allow users to access resources that are allocated to partitions other than their assigned partition. For example, a user assigned to Partition 1 is allowed to access (i.e., use) resources R11-R20, which are allocated to Partition 2. Such access or use of resources is termed secondary use of the resources in that partition. Thus, when a primary user of Partition 1 communicates using resources belonging to Partition 2 (i.e. R11-R20), we refer to those communications as secondary communications over Partition 2. All communications, whether primary or secondary, are controlled by suitable transmission rules. Transmission rules comprise any instructions, procedures, or policies that regulate communications over resources of a wireless network. For example, the transmission rules may control a transmit power for secondary communications so that the secondary communications do not interfere with primary communications on the partition. When secondary communications are allowed to take place over a partition, they may be controlled by transmission rules that are more restrictive than those used for primary communications over that partition. These restrictive transmission rules are intended to avoid the situation where the secondary communications cause interference to primary communications of a partition. This concept of using resources for secondary communications (under restrictive transmission rules) is referred to herein as "soft reuse" of the resources. The reuse is considered "soft" because the secondary communications are subject to restrictive transmission rules.

Transmission control (i.e., enforcement of transmission rules) in wireless network 100 may be handled by control system 114 of FIG. 1. As stated earlier, components of control system 114 may reside at any node, server, user device, or other system that controls how resources are used for transmitting/receiving data over the air interface based on transmission rules.

Figure 2:
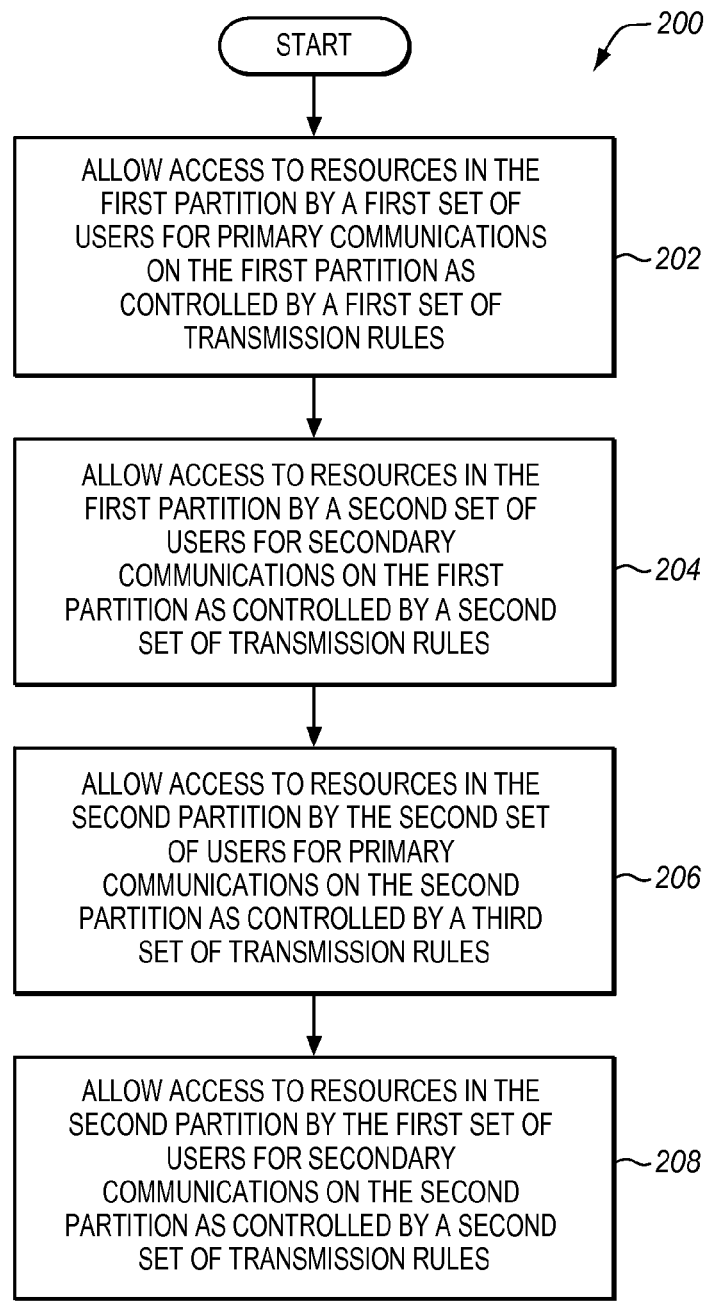
FIG. 2 is a flow chart illustrating a method of reusing resources partitioned in a wireless network in an exemplary embodiment.

FIG. 2 is a flow chart illustrating a method 200 of reusing resources partitioned in wireless network 100 in an exemplary embodiment. The steps of method 200 will be described with reference to control system 114 in FIG. 1, but those skilled in the art will appreciate that method 200 may be performed in other systems. The steps of the flow charts described herein are not all inclusive and may include other steps not shown. The steps may also be performed in an alternative order.

In step 202, control system 114 allows access to the resources of Partition 1 for primary communications by a first set of users. In other words, the first set of users is assigned to Partition 1 (R1-R10) for primary communications. Thus, control system 114 may access one or more of resources R1-R10 for primary communications by the primary users. The primary communications over Partition 1 are controlled by a set of transmission rules, which may define among other things, transmit powers used for the primary communications over Partition 1.

In step 204, control system 114 allows access to the resources of Partition 1 for secondary communications by a second set of users. The second set of users is not assigned to Partition 1, but is assigned to another partition, such as Partition 2. Thus, any communications by the second set of users over the resources allocated to Partition 1 are referred to as secondary communications. The secondary communications are controlled by another set of transmission rules that are potentially different than the transmission rules defined for primary communications over Partition 1. The transmission rules are intended to restrict the secondary communications in such a way as to avoid interfering with primary communications over Partition 1.

In step 206, control system 114 allows access to the resources of Partition 2 for primary communications by the second set of users. The second set of users is assigned to Partition 2 for primary communications over that partition. Thus, control system 114 may allow access to one or more of resources R11-R20 for primary communications by the primary users of Partition 2. The primary communications over Partition 2 are controlled by a set of transmission rules, which may define among other things, transmit powers used for the primary communications over Partition 2.

In step 208, control system 114 allows access to the resources of Partition 2 for secondary communications by another set of users (such as the first set of users that are primary users of Partition 1). This other set of users is not assigned to (i.e., are not primary users of) Partition 2. Thus, any communications by this set of users over the resources allocated to Partition 2 are referred to as secondary communications. The secondary communications are controlled by another set of transmission rules that are potentially different than the transmission rules defined for primary communications over Partition 2. The transmission rules are intended to restrict the secondary communications is such a way as to avoid interfering with primary communications over Partition 2.

The transmission rules may define transmit powers for base stations that serve a session. In one embodiment, the transmit powers for secondary communications on a downlink may be statically or semi-statically set at a level which is less likely to interfere with primary communications of a partition.

In another embodiment, the transmit powers for secondary communications may be determined based on measurements on communication paths to limit interference with primary communications. In a typical wireless network, the received signal strength and the signal-to-interference-plus noise (SINR) values are known for each communication path. Thus, the interference-plus-noise for a given communication path may be easily estimated. The transmission rules may ensure that the transmit power of a communication source (e.g., a mobile device in an uplink communication) be set at a level such that the corresponding power at the intended receiver does not exceed a specified fraction of the interference-plus-noise of the primary communications over the partition being used. In this way, secondary communications over a partition would not cause significant interference to primary communications over the partition.

In yet another embodiment, the transmit powers for secondary communications may be determined based on target operating points, such as a target interference-over-thermal (IoT) or target SINR. In a typical wireless network, systems (especially on the uplink) operate near a desired IoT, SINR, etc. Consider the exemplary case where there is a target IoT. When the desired IoT is exceeded, control system 114 instructs mobile devices to adjust their transmit powers downward based on a predetermined step size. When the target IoT is not met, control system 114 instructs the mobile device to adjust their transmit powers upward based on a predetermined step size. According to the transmission rules defined herein, the step sizes for adjusting the transmit powers for secondary (uplink) communications may be different than for primary (uplink) communications. The step sizes for adjusting transmit powers upward may be smaller for secondary communications, and the step sizes for adjusting transmit powers downward may be larger. Based on these transmission rules, control system 114 forces mobile devices engaged in secondary communications over a partition to adjust their transmit powers more conservatively than those engaged in primary communications over that partition. This type of power adjustment helps to ensure that the secondary communications over a partition do not cause significant interference to primary communications over the partition.

The method of FIG. 2 may include additional steps for a third partition, a fourth partition, etc., depending on the number of partitions defined in wireless network 100. Thus, control system 114 may softly reuse resources that are allocated to multiple other partitions. This reuse of resources advantageously improves throughput of the network 100.

EXAMPLES

Figure 3:
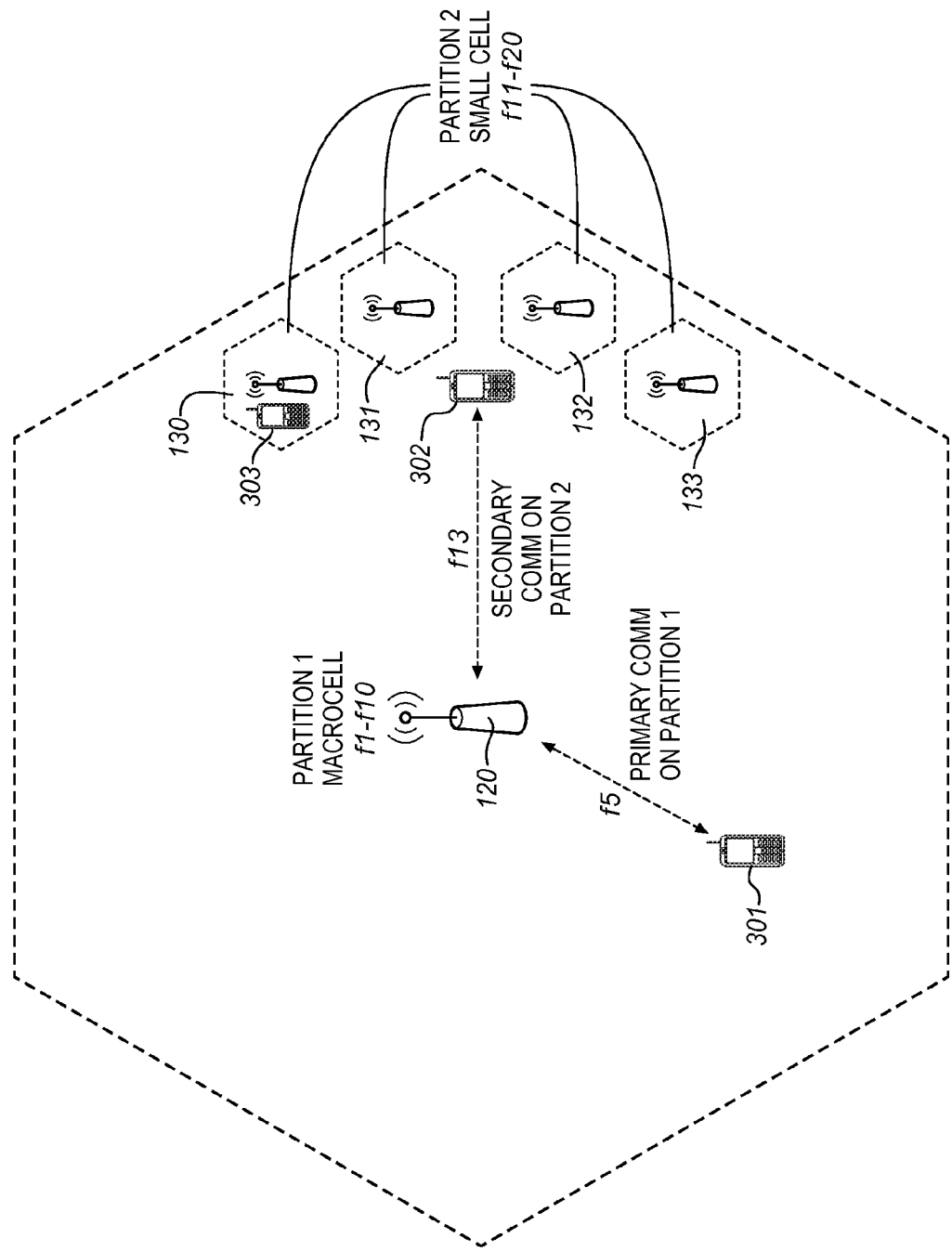
FIG. 3 illustrates a portion of a wireless network in an exemplary embodiment.

FIG. 3 illustrates a portion of wireless network 100 in an exemplary embodiment. This portion of wireless network 100 includes one macrocell 120 and four small cells 130-133. In this example, wireless network 100 uses FDMA technology on the air interface, where the entire spectrum of available frequencies includes frequencies f1-f20. Further, a control system, such as control system 114 in FIG. 1, has divided resources of wireless network 100 into two partitions: Partition 1 comprising frequencies f1-f10, and Partition 2 comprising frequencies f11-f20. Control system 114 allows access to resources in Partition 1 and Partition 2 based on the type of base station (or type of cell) involved in the communications. Thus, control system 114 allows access to frequencies f1-f10 by base station 120 for primary communications on Partition 1 (as controlled by a set of transmission rules). Control system 114 also allows access to frequencies f1-f10 by base stations 130-133 for secondary communications on Partition 1 (as controlled by a potentially different set of transmission rules).

Thus, if mobile device 301 enters the coverage area of base station 120 and initiates a session, base station 120 and/or mobile device 301 is allowed to access one or more of frequencies f1-f10 for primary communications. As shown in FIG. 3, base station 120 selects frequency f5 for the session involving mobile device 301. Control system 114 also identifies transmission rules that are defined for primary communications on Partition 1. The transmission rules may define, among other things, a transmit power to use for the primary communications with mobile device 301. As an example, the transmit power for base station 120 may be 46 dBm for primary communications on Partition 1.

Control system 114 also identifies the subset of resources allocated to Partition 2, which are frequencies f11-f20. Control system 114 allows access to frequencies f11-f20 by base stations 130-133 and mobile devices that are served by base stations 130-133 for primary communications on Partition 2 (as controlled by a set of transmission rules). Control system 114 also allows access to frequencies f11-f20 by base station 120 for secondary communications on Partition 2 (as controlled by a potentially different set of transmission rules).

Thus, if mobile device 302 enters the coverage area of base station 120 and initiates a session with base station 120, the latter is allowed to access one or more frequencies f11-f20 for secondary communications. As shown in FIG. 3, base station 120 selects frequency f13 for the session involving mobile device 302. Base station 120 also identifies transmission rules that are defined for secondary communications on Partition 2. The transmission rules may define, among other things, a transmit power to use for the secondary communications with mobile device 302. As an example, the transmit power for base station 120 may be around 23 dBm for secondary communications on Partition 2. Base station 120 may use considerably less power on Partition 2 than on Partition 1, because its communications on Partition 2 is secondary and should not cause significant interference to the primary communications that base stations 130-133 use on Partition 2.

A similar event can happen for a mobile device 303 that is served by one of the small cells 130-133 and primarily communicates on Partition 2 which spans f11-f20. The serving small cell 130 may communicate to mobile device 303 in a secondary manner on Partition 1 which spans f1-f10. In this case, because transmit powers of small cells 130-133 are already much lower than the macrocells 120, control system 114 may decide that small cells can transmit at the same power on Partitions 1 and 2.

In this example, a base station would normally communicate with mobile devices in its coverage area using resources in the partition allocated to it (i.e., where the base station is a primary user of that partition). Thus, base station 120 would normally use Partition 1 (f1-f10) to communicate with mobile devices in its coverage area. However, if base station 120 experiences congestion (e.g., if there are too many mobile devices in its coverage area), then it may use resources in Partition 2 (i.e., f11-f20) in a secondary manner to communicate with some of the mobile devices in its coverage area. As described earlier, base station 120 would be restricted by the transmission rules for its secondary communications (i.e., those over resources f11-f20).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
a control system implemented in a wireless network,
wherein radio communications resources of the wireless network are divided into partitions,
the control system is operable to allow access to resources in a first partition by a first set of users for primary communications on the first partition as controlled by a first set of transmission rules, and to allow access to resources in the first partition by a second set of users for secondary communications on the first partition as controlled by a second set of transmission rules; and
the control system is further operable to allow access to resources in a second partition by the second set of users for primary communications on the second partition as controlled by a third set of transmission rules, and, in response to an exceeded threshold of congestion in the first partition, to allow access to resources in the second partition by the first set of users for secondary communications on the second partition as controlled by a fourth set of transmission rules.

2. The system of claim 1 wherein the second set of transmission rules for secondary communications on the first partition are more restrictive than the first set of transmission rules defined for primary communications on the first partition.

3. The system of claim 1 wherein:
the fourth set of transmission rules define base station transmit powers for the secondary communications on the second partition; and
the base station transmit powers for the secondary communications on the second partition are lower than base station transmit powers for primary communications on the second partition.

4. The system of claim 3 wherein:
the control system is further operable to measure interference on transmission paths that are established for the secondary communications on the first partition, and to adjust the transmit powers based on the measured interference.

5. The system of claim 1 wherein:
the control system is further operable to identify the first set of users and the second set of users based on types of base stations involved in the communications.

6. The system of claim 1 wherein:
the control system is further operable to identify the first set of users and the second set of users based on types of services being provided to those users.

7. The system of claim 1 wherein:
the control system is further operable to identify the first set of users and the second set of users based on types of mobile devices involved in the communications.

8. The system of claim 1 wherein:
the control system is further operable to identify the first set of users and the second set of users based on types of technology used for the communications.

9. A method of controlling access to radio communications resources of a wireless network that are divided into partitions, the method comprising:
allowing, via a control system, access to resources in a first partition by a first set of users for primary communications on the first partition as controlled by a first set of transmission rules;
allowing access to resources in the first partition by a second set of users for secondary communications on the first partition as controlled by a second set of transmission rules;
allowing access to resources in a second partition by the second set of users for primary communications on the second partition as controlled by a third set of transmission rules; and
in response to an exceeded threshold of congestion in the first partition, allowing access to resources in the second partition by the first set of users for secondary communications on the second partition as controlled by a fourth set of transmission rules.

10. The method of claim 9 wherein the second set of transmission rules for secondary communications on the first partition are more restrictive than the first set of transmission rules defined for primary communications on the first partition.

11. The method of claim 9 wherein:
the fourth set of transmission rules define base station transmit powers for the secondary communications on the second partition; and
the base station transmit powers for the secondary communications on the second partition are lower than base station transmit powers for primary communications on the second partition.

12. The method of claim 11 further comprising:
measuring interference on transmission paths that are established for the secondary communications on the first partition; and
adjusting the transmit powers based on the measured interference.

13. The method of claim 9 further comprising:
identifying the first set of users and the second set of users based on types of base stations involved in the communications.

14. The method of claim 9 further comprising:
identifying the first set of users and the second set of users based on types of services being provided to those users.

15. The method of claim 9 further comprising:
identifying the first set of users and the second set of users based on types of mobile devices involved in the communications.

16. The method of claim 9 further comprising:
identifying the first set of users and the second set of users based on types of technology used for the communications.

17. A non-transitory computer readable medium tangibly embodying programmed instructions which, when executed by a processor, are operable to control access to radio communications resources of a wireless network that are divided into partitions by:
allowing access to resources in a first partition by a first set of users for primary communications on the first partition as controlled by a first set of transmission rules;
allowing access to resources in the first partition by a second set of users for secondary communications on the first partition as controlled by a second set of transmission rules;
allowing access to resources in a second partition by the second set of users for primary communications on the second partition as controlled by a third set of transmission rules; and
in response to an exceeded threshold of congestion in the first partition, allowing access to resources in the second partition by the first set of users for secondary communications on the second partition as controlled by a fourth set of transmission rules.

18. The medium of claim 17 wherein the second set of transmission rules for secondary communications on the first partition are more restrictive than the first set of transmission rules defined for primary communications on the first partition.

19. The medium of claim 17 wherein:
the fourth set of transmission rules define base station transmit powers for the secondary communications on the second partition; and
the base station transmit powers for the secondary communications on the second partition are lower than base station transmit powers for primary communications on the second partition.

20. The medium of claim 19 wherein the instructions are further operable to:
measure interference on transmission paths that are established for the secondary communications on the first partition; and
adjust the transmit powers based on the measured interference.

* * * * *